Sept. 10, 1963 F. G. WILLARD 3,103,577

DIGITAL SIGNAL SENSING APPARATUS

Filed July 13, 1959 2 Sheets-Sheet 1

Sept. 10, 1963 F. G. WILLARD 3,103,577

DIGITAL SIGNAL SENSING APPARATUS

Filed July 13, 1959 2 Sheets-Sheet 2

WITNESSES

Leon J. Laza

James F. Young

INVENTOR

Frank G. Willard

BY

ATTORNEY

United States Patent Office 3,103,577

Patented Sept. 10, 1963

3,103,577
DIGITAL SIGNAL SENSING APPARATUS

Frank G. Willard, Clarence, N.Y., assignor to Westinghouse Electric Corporation, East Pittsburgh, Pa., a corporation of Pennsylvania Filed July 13, 1959, Ser. No. 826,778
6 Claims. (Cl. 235—61.7)

The present invention relates in general to signal sensing apparatus and more particularly, to digital signal sensing apparatus operative to make an identity comparison between a plurality of applied digital signals and responsive to at least a predetermined one digit of each of these signals in this regard.

It is an object of the present invention to provide improved sensing apparatus operative to more easily make an identity or comparison check between at least two applied input signals for readily determining the similarity between the signals.

It is a different object of the present invention to provide improved signal sensing or comparison apparatus operative to better compare at least one digit of the reference input signal with at least a corresponding digit of other input signals.

It is a further object of the present invention to provide improved signal sensing or checking apparatus operative to more reliably and more simply determine the similarity between a plurality of applied signals, and in addition to provide a signal storage function without the requirement of additional apparatus being provided for the latter storage function.

It is an additional object of the present invention to provide improved signal sensing apparatus operative to better provide an indication of the similarity between applied input signals and a predetermined reference signal such that an indication is made only when such similarity is present.

Briefly, and in accordance with the objects of the present invention, there is provided a multiple input comparison circuit having for each input a gating circuit and a memory device, with the gating circuit being controlled in part by the output of the memory device, and the output of the memory device being controlled by the operation of the gating circuit. In operation, the memory devices associated with each input are all set to the same state to give a Zero output which is fed back to the associated gating circuit each of which is enabled for operation, by virtue of a control signal. A first or reference signal, which may be obtained from a punched card, is then applied to one of the inputs of the comparison circuit. The gating circuit associated with that input passes the signal to the memory device where its output state is changed, and this then becomes the reference input for all subsequent inputs from other punched cards. The output of the memory device that changed its state, holds its associated gating circuit open so that any further input signals on that particular line will be passed through the gating circuit to provide an output signal. The operation of the comparison circuit is such that as long as a punched card produces a second input signal which is applied to the latter open gating circuit, an output signal will occur, and if subsequent punched cards apply additional input signals to any input other than this open gating circuit, no output signal will occur.

The stated, and other objects and advantages of the present invention will become still more apparent from a study of the following description taken in conjunction with the drawings wherein.

Figure 1:
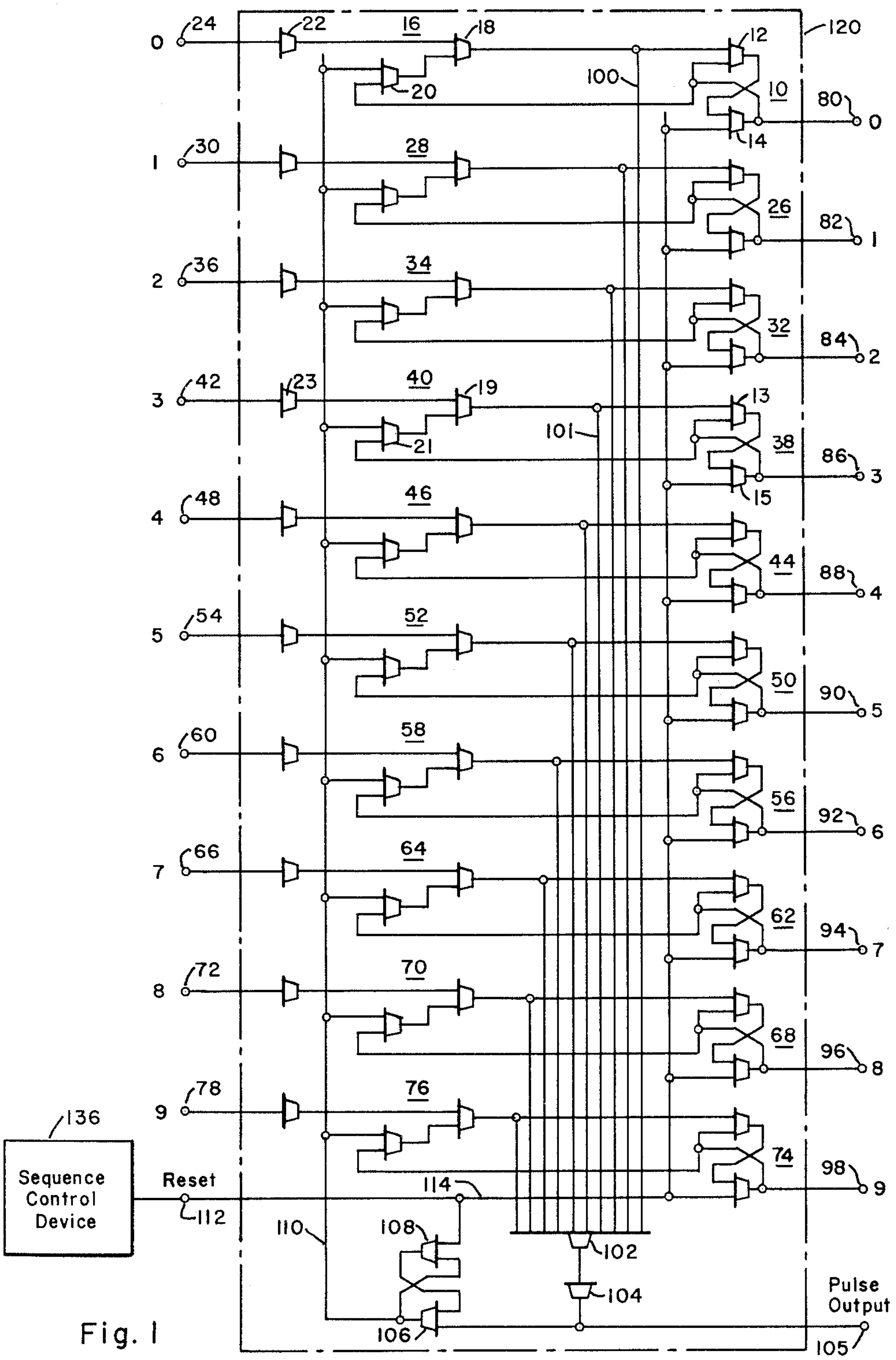
FIGURE 1 is a schematic showing of the signal sensing apparatus in accordance with the present invention.

In FIG. 1, there is shown signal sensing or identity checking apparatus operating with a single digit of a decimal coded signal. More specifically, there is provided a memory or storage device 10 including a first NOR device 12 and a second NOR device 14. A gate circuit 16 is also provided including a first NOR device 18, a second NOR device 20 and a third NOR device 22. The storage device 10 is controlled in its operation by the gate circuit 16 relative to an input binary or similar signal applied to a terminal 24, which could correspond to a zero decimal digit, or other predetermined digit such as for example the most significant digit, of a decimal coded digital signal. A second such storage device 26 is controlled by a second such gate device 28 relative to a binary signal applied to an input terminal 30 for the one decimal digit of the multiple digit decimal coded signal. A third such storage device 32 is similarly operative with a third gate device 34 and an input terminal 36 provided for the two decimal digit of the input signal. A fourth such storage device 38 is operative with a gate device 40 and a terminal 42 for the three decimal digit. A storage device 44 and a gate device 46 are operative with the terminal 48 for the four decimal digit. A storage device 50 and a gate 52 are operative with a terminal 54, for the five decimal digit. A storage device 56 and a gate device 58 are similarly operative with a terminal 60 for the six decimal digit. A storage device 62 and a gate device 64 are so operative with a terminal 66 relative to the seven decimal digit. A storage device 68 and a gate device 70 are operative with a terminal 72 for the eight decimal digit. And a storage device 74 and a gate device 76 are similarly operative with a terminal 78 for the nine decimal digit signal.

Each of the storage devices is provided with an output from one of its NOR devices or NOR elements. Relative to the storage device 10 an output terminal 80 is provided, with the output signal being supplied to the terminal 80 when the NOR device 14 is providing an output signal and the NOR device 12 is not providing an output signal. Similarly the terminal 82 is so operative with the storage device 26. The terminal 84 is so operative with the storage device 32. The terminal 86 is so operative with the storage device 38. The terminal 88 is so operative with the storage device 44. The terminal 90 is similarly operative with the storage device 50. The terminal 92 is similarly operative with the storage device 56. The terminal 94 is similarly operative with the storage device 62. The terminal 96 is similarly operative with the storage device 68. And the terminal 98 is similarly operative with the storage device 74.

Due to the operation of each storage device, when the NOR device 18 provided within the gate device 16 has an output signal, it causes the NOR device 12 not to have an output signal which in turn causes the NOR device 14 to have an output signal and apply it to the terminal 80. Thusly, when the NOR device 18 within the gate device 16 has an output signal, the storage device 10 also has an output signal. The output signal of the NOR device 18 is applied through a conductor 100 to one input of a NOR device 102 such that when a one value signal is applied through the conductor 100 to the NOR device 102, the latter device 102 does not have an output signal which in turn causes the NOR device 104 to have an output signal. Thusly, when any one of the gate devices 16, 28, 34, 40, 46, 52, 58, 64, 70 and 76 has an output signal, the NOR device 104 also has an output signal which is applied to an output terminal 105 for signal identification purposes as will be later explained.

Also, the output signal from the NOR device 104 is applied to a NOR device 106 operative with a second NOR device 108 as a storage or memory device. When the NOR device 104 has an output signal, the NOR device 106 does not have an output signal. The output of the latter NOR device 106 is connected to an override conductor 110 which is connected to the NOR element 20 within the gate circuit 16 and the corresponding NOR element of each of the other gate devices, namely the gate devices 28, 34, 40, 46, 52, 58, 64, 70 and 76 for controlling the operation of the gate devices as will be later explained.

A reset input terminal 112 is operative with a conductor 114 connected to one input of the NOR device 14 within the storage device 10 and the corresponding NOR device within each of the other storage devices, namely the storage devices 26, 32, 38, 44, 50, 56, 62, 68 and 74 for a purpose which will be later explained.

It should be noted that each of the storage devices, namely the storage devices 10, 26, 32, 38, 44, 50, 56, 62, 68 and 74 when operative to provide an output signal, has the output of its respective gate control device or circuit connected to one input of the NOR device 102 to indicate that an output signal is thereby provided. The connections from each of the gate devices 16, 28, 34, etc. to the NOR device 102 causes the NOR device 104 to provide a one value output signal only when one of these gate devices has a one value output signal. And a one value output signal from any of these gate devices can occur only when its input terminal receives a one value input signal and there is provided either an override signal on conductor 110 or an output one value signal from its associated storage device. For example, relative to gate device 16, a one value input signal supplied to terminal 24 and an output signal from storage device 10 will cause the NOR device 104 to provide a one value output signal.

Figure 2:
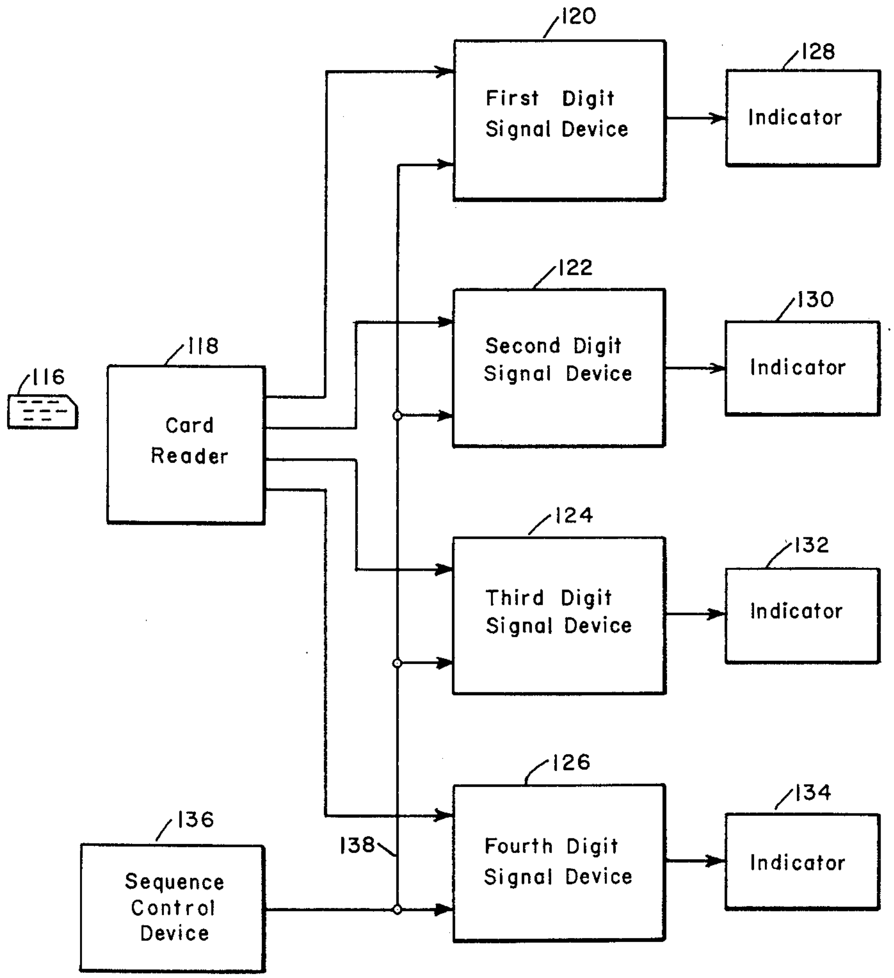
FIG. 2 is a diagrammatic showing of a plurality of signal sensing devices operative with the respective multiple digits of an applied input signal.

In FIG. 2, there is shown a punched card 116 which per se is well known to persons skilled in this particular art, and could include 80 vertical columns and in the order of ten horizontal rows wherein punches could be made into the card to provide indications of stored signal information. Thusly, the first horizontal row could correspond to the zero decimal digit, the second horizontal row could correspond to the one decimal digit, the third horizontal row could correspond to the two decimal digit, etc., with the tenth horizontal row corresponding to the nine decimal digit. If it were desired to express a decimal number, the first vertical column such as for example the vertical column furtherest to the left of the card could indicate the most significant decimal digit and if this digit were for example three, a punch could be placed in the fourth horizontal row of the first column. If the next decimal digit were a two, a punch could be placed in the third horizontal row, etc., using as many vertical columns as were desired to indicate the decimal number involved. In this manner, information could be stored in the punched card in the form of punched holes in the card in pure decimal coding as opposed to binary coding. If it were desired to provide a plurality of such punched cards for controlling some industrial operation such as the rolling of a strip of metal in a rolling mill, and a plurality of cards were needed for controlling successive passes through the mill it may be desirable to identify the set of such punched cards required for the rolling of a particular strip of metal. The control apparatus, as shown in FIG. 1 for example, could be utilized to identify a particular decimal digit of some card set identification number, such as for example, the most significant decimal digit, for each of these cards to thereby provide an indication that the set of cards mentioned in the above example all had the same card set identification code number and therefore corresponding in a particular decimal digit.

In FIG. 2, there is shown a control apparatus for identifying each of four decimal digits. Thusly, there is shown a card 116 operative with a card reader 118 with the output of the card reader being in the form of parallel digital signals. The signal, for example a decimal signal such as operative with the apparatus shown in FIG. 1 for the most significant decimal digit, can be supplied to the first digital signal device 120. The next successive digit could be supplied to the second digit signal device 122, the third digit to the third digit signal device 124, and a fourth digit, which in the case of a card 116 having only four decimal digits on it as would be required for expressing decimal numbers up through 9999, would be supplied to a fourth digit signal device 126.

In this regard it should be understood that the signals supplied to the respective signal devices 120, 122, 124 and 126 actually are over ten conductors such as would be required for connection to the control apparatus shown in FIG. 1 through the respective terminals 24, 30, 36, 42, 48, 54, 60, 66, 72 and 78, in the case of decimal numbers. However the present control apparatus would be readily operative with binary members for example with only two such conductors being required for each signal device. After a first identifying decimal digit for a particular reference punched card has been supplied to each of the signal devices 120, 122, 124 and 126 as will be later explained, then successive or subsequent punched cards similar to the punch card 116 and that correspond in the respective digits to the initial or reference card arrangement of the digits would provide output signals to the respective indicator devices. When the first digit corresponded to the reference digit the indicator device 128 would be energized. When the second digit corresponded to the reference digit the second digit device 122 would provide an output signal to the indicator 130. When the third decimal digit corresponded to the reference or predetermined desired digit, the third digit device 124 would provide an output signal to the indicator device 132. When the fourth decimal digit corresponds to the reference or predetermined desired digit, the fourth digit signal device 126 would provide an output signal to the indicator 134.

A sequence control device 136, which in a simple installation could be replaced by a manual push button, is operative as a control for the operation of the signal devices, such that a reset signal is provided through the conductor 138 for resetting each of the digit signal devices.

Figure 3:
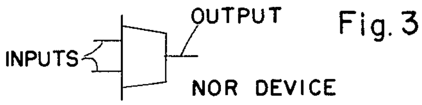
FIG. 3 is a diagrammatic representation of a well known and standard NOR device.

In FIG. 3, there is shown the standard symbol for a NOR logic element. The operation of a NOR element is such that for any input signal (there may be more than that shown) there is no output signal. An output signal will occur only if there are no input signals.

In the operation of the control apparatus as shown in FIG. 1, a sequence control device 136 is operative to provide a reset control signal to the terminal 112 and the conductor 114 for resetting the operation of each of the storage devices, namely the storage devices 10, 26, 32, 38, 44, 50, 56, 62, 68 and 74 such that no output signals are supplied to their respective output terminals. The same reset pulse applied to the terminal 112 is supplied to an input of the NR device 108 causing it to have a zero output such that the NOR device 106 is thereby caused to have a one output since its second terminal as supplied by the NOR device 104 at this time also is not energized. In this regard, none of the inputs of the NOR device 102 are now energized such that it does have an output signal causing the NOR device 104 also not to have an output signal. The output signal from the NOR device 106 through the conductor 110 energizes one input of the NOR device 20 in the gate circuit 16 and one input of the respective corresponding NOR devices in each of the other gate circuits for the respective storage devices. This causes the NOR device 20 and its corresponding NOR devices in the other respective gate circuits to have a zero output signal. However, unless a punched card operative with a card reader 118 such as shown in FIG. 2 is present, and in addition causes a one value output signal to be supplied to one of the respective input terminals, namely the terminals 24, 30, 36, 42, 48, 54, 60, 66, 72 and 78 then the NOR device 22 and the corresponding NOR devices for the other respective gate circuits do not receive a one value input signal. If they do not receive a one value input signal they provide a one value output signal. This one value signal causes the NOR device 18, since one of its inputs is now energized with a one value input signal, to have a zero value output signal, and the corresponding NOR devices in the other respective gate circuits operate in a similar manner. The storage device 10 will not change its operative state, as previously reset with the NOR device 12 supplying a one value output signal, unless the NOR device 18 supplies a one value output signal.

When a punch card 116 operative with a card reader 118 provides a one value signal to one of the respective input terminals, such for example as the three decimal terminal 42, such that the particular digit such as the most significant decimal digit has a three value. The NOR device 23 operative with the terminal 42 is supplied with a one value signal such that it does not have an output signal. Thuslay, the NOR device 19 within the gate circuit 40 has each of its inputs supplied with a zero value signal at the present time, since the one value signal through the conductor 110 is still energizing the NOR device 21 with a one value signal. The NOR device 19 then has a one value output signal which is supplied through the conductor 101 to an input of the NOR device 102 causing it to have zero output signal which in turn results in the NOR device 104 having a one value output signal which is supplied as an output pulse to the terminal 105 and an indicator device of a suitable nature as may be desired. The same one value output signal from the NOR device 104 causes the NOR device 106 to no longer have an output signal since the reset control signal supplied to the conductor 114 by the sequence control device 136 is no longer present. The NOR device 108 has both of its inputs no longer energized such that it provides an output signal to hold the NOR device 106, such that the NOR device 106 does not provide an output signal.

Since the NOR device 106 no longer supplies an output signal to the conductor 110, the NOR device 20 within the gate circuit 16 no longer is supplied with a one value signal to its input connected to the conductor 110. Further, the NOR device 14 with a storage circuit 10 is not providing an output signal, so the second input of the NOR device 20 is also not energized. Thusly, the NOR device 20 provides a one value output signal, which locks or prevents the transmission of any control signals through the NOR device 18 to cause the storage device 10 to change its state of operation. This may be considered as a hold or lock-out operation of the gate circuit 16, and the other similar gate circuits or devices. However, in the case only of the gate circuit 40, the output signal from the NOR device 19 was supplied to one input of the NOR device 13 within the storage device 38. The NOR device 13 now is providing a zero output signal, and simultaneously the conductor 114 is not supplying a one value output signal, such that the NOR device 15 now provides a one value output signal to the terminal 86. This one value output signal from the NOR device 15 is also supplied to one input of the NOR device 21 causing it to have a zero value output signal as supplied to one input of the NOR device 19. Thusly, when the initial reference punched card is removed from the card reader 118, and subsequent punched cards are supplied to the card reader 118, for each of those additional cards which has a three decimal value in the corresponding digit, the most significant digit for example, a control signal will be supplied to the terminal 42 causing the NOR device 23 to have a zero output signal such that the NOR device 19 again is provided with a one value output signal that it supplies to the conductor 101. The latter signal again causes the NOR device 102 not to have an output signal thereby causing the NOR device 104 to again provide an output signal to the output terminal 105 and any suitable indicator devices provided in this regard.

Thusly, when a punched card that has a three decimal value in the most significant digit is not present within the card reader 118, a control signal is not supplied to the terminal 42 and the NOR device 23 provides a one value output signal to prevent the NOR device 19 from so providing a one value output signal. However, whether the NOR device 19 provides an output signal or does not provide an output signal, the operating state of the storage device 38 does not change in that the output signal from the NOR device 15 holds the NOR device 13 in its zero value output signal operating condition, and as long as a reset pulse is not supplied to the conductor 114, the operating state of the NOR device 15 does not change.

The operation of the respective digit signal devices shown in FIG. 2 is the same as the operation of the individual digit signal device as shown in FIG. 1. Each of the digit signal devices, however, is similarly operative relative to a different decimal digit of the punch card as supplied to the card reader 118.

It should be further noted that the present control apparatus is well suited for control systems which are to be controlled by means of data presented on punch cards and such systems frequently must be capable of following a multiple card data specification. Often it is desirable in such a case to test whether each of a group of punched cards pertains to the same specification, that is, to test whether or not a consistent set of punched data cards has been presented to the control apparatus. The present control apparatus performs this function and at the same time provides decimal storage for the specification number. Thusly, in the operation of the present control apparatus, after the application of the reset control signal, the first decimal input signal applied is recorded and an output pulse is supplied to a suitable indicator device as may be desired. Further identical decimal inputs for the respective additional punched data cards will result in output pulse signals. Different decimal inputs will not so result in output pulse signals, such that identification in this regard is clearly provided.

Although the invention has been described with a certain degree of particularity, it should be understood that the present disclosure has been made only by way of example, and that numerous changes in the details of construction and the combination and arrangement of parts may be resorted to without departing from the scope and spirit of the present invention.

I claim as my invention:

1. In digital signal control apparatus operative with an input digital signal, the combination of a plurality of signal storage devices, with each of said signal storage devices having at least a first state of operation wherein an output signal is provided and a second state of operation wherein an output signal is not provided, a plurality of gate devices, with each of said gate devices being operatively connected to control the operation of a different one of said storage devices and being responsive to at least one digit of said input signal, and with each of said gate devices being responsive to the state of operation of at least one of said storage devices, a source of a first control signal operatively connected to each of said storage devices for controlling each of said storage devices to operate in a predetermined one of said first and second states of operation, and a source of a second control signal operatively connected to each of said gate devices for controlling the response of the respective storage devices operative with the latter said gate devices to the respective digits of said input signal.

2. In digital signal sensing apparatus operative with first and second input digital signals, the combination of a plurality of signal storage devices, with each of said signal storage devices having a first state of operation for providing an output signal and a second state of operation for not providing an output signal, a plurality of gate devices, with each of said gate devices being operatively connected to control the operation of a different one of said storage devices and being responsive to at least one digit of said input signal, and with each of said gate devices being responsive to the state of operation of at least one of said storage devices, and a source of a control signal operatively connected to each of said gate devices for controlling the response of said storage devices to the respective digits of said first and second input signals, with said storage devices being responsive to said first input signal while said control signal is provided to establish the operative stage of at least one of said storage devices in accordance with said first input signal, said storage devices being subsequently responsive when said control signal is not provided to said second input signal only if said second input signal is substantially the same as said first input signal.

3. In digital signal sensing apparatus operative with at least a plurality of input digital signals, the combination of a plurality of signal storage devices, with each of said signal storage devices having at least a first state of operation in which an output signal is provided and a second state of operation in which an output signal is not provided, a plurality of gate devices, with a different one of said gate devices being operatively connected to control the operation of each of said storage devices and being responsive to one digit of said input signal, and with each of said gate devices being responsive to the state of operation of at least one of said storage devices, a source of a reset control signal operatively connected to each of said storage devices for causing each of said storage devices to operate in a predetermined one of said first and second states of operation, and a source of a second control signal operatively connected to each of said gate devices for controlling the response of said gate devices to respective digits of said input signal, with said storage devices being simultaneously responsive to said second control signal and a predetermined one of said input signals for controlling the operation of at least one of said storage devices in accordance with said one input signal, and with at least said one storage device being subsequently operative with the others of said plurality of input signals such that at least said one storage device is responsive only to other input signals that are substantially the same as said one input signal.

4. In digital signal sensing apparatus operative with a plurality of multiple digit input signals, the combination of a plurality of signal storage devices, with one of said storage devices being provided for each respective digit of a predetermined one of said input signals and with each of said storage devices having a first state of operation in which an output control signal is provided and a second state of operation in which an output control signal is not provided, a plurality of gate devices, with each of said gate devices being operatively connected to control the operation of a different one of said storage devices and being responsive to one digit of said input signals, and with each of said gate devices being responsive to the state of operation of at least one of said storage devices, a source of a first control signal operatively connected to each of said storage devices for causing said storage devices to operate in a predetermined one of said first and second states of operation, and a source of a second control signal operatively connected to each of said gate devices for controlling the response of said gate devices to the respective digits of said input signals, with said storage devices being responsive to said predetermined one input signal when said second control signal is provided, and with said storage devices being responsive to each of the other input signals that are similar to said predetermined one input signal when said second control signal is not provided.

5. In signal control apparatus operative with at least one input digital signal, the combination of at least one signal storage device, with said signal storage device having a first state of operation in which an output control signal is provided and a second state of operation in which an output control signal is not provided, at least one gate device, with said one gate device being operatively connected to control the operation of said one storage device and being responsive to at least one digit of said input signal, and with said gate device being responsive to the state of operation of said storage device, a source of a first control signal operatively connected to said one storage device for causing said one storage device to operate in a predetermined one of said first and second states of operation, and a source of a second control signal operatively connected to said one gate device for controlling a predetermined response characteristic of said one storage device to at least said one digit of said input signal, with said one storage device when said second control signal is not provided being responsive to an input signal only if the latter said input signal is in accordance with said predetermined response characteristic.

6. In digital signal sensing apparatus operative with at least first and second input signals, the combination of a plurality of signal storage devices, with each of said signal storage devices having a first state of operation in which an output control signal is provided and a second state of operation in which an output control signal is not provided, a plurality of gate devices, with each of said gate devices being operatively connected to control the operation of a different one of said storage devices, and with each of said gate devices being responsive to the state of operation of at least one of said storage devices, a source of a first control signal operatively connected to each of said storage devices for causing the respective storage devices to operate in a predetermined one of said first and second states of operation, a source of a second control signal operatively connected to each of said gate devices for controlling the response of the respective storage devices to at least one digit of said first and second input signal, with said storage devices when said second control signal is not so provided being responsive to at least a corresponding digit of said second input signal for providing an indication of the similarity of the latter corresponding digit of the second input signal relative to at least said one digit of the first input signal, and an indicator device operative with at least one of said storage devices and responsive to any output control signal provided by the latter said one storage device.

References Cited in the file of this patent

UNITED STATES PATENTS

| | | |
|---|---|---|
| 2,719,959 | Hobbs | Oct. 4, 1955 |
| 2,845,220 | Bensky | July 29, 1958 |
| 2,889,534 | Lubkin | June 2, 1959 |
| 2,910,235 | Southard | Oct. 27, 1959 |
| 2,920,310 | Sallach | Jan. 5, 1960 |
| 2,946,983 | Borders | July 26, 1960 |
| 2,959,768 | White | Nov. 8, 1960 |

OTHER REFERENCES

Publication: "General Electric Transistor Manual," 3rd Edition, General Electric Co., pp. 95–96, Syracuse, N.Y.